Feb. 17, 1925.
G. W. FUTCH
1,527,039
FRUIT PACKER'S TABLE
Filed June 17, 1922
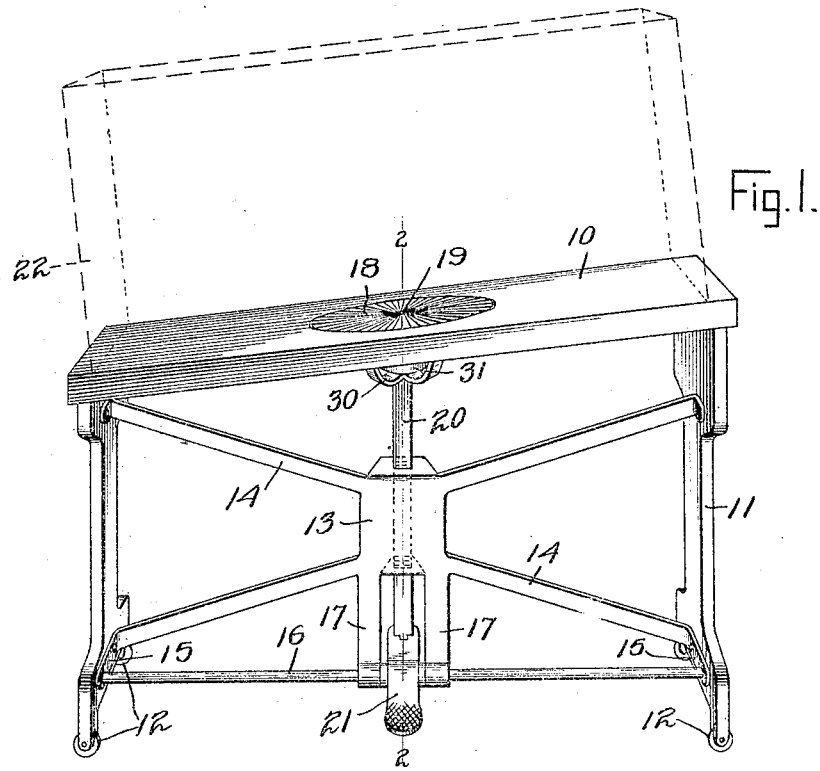
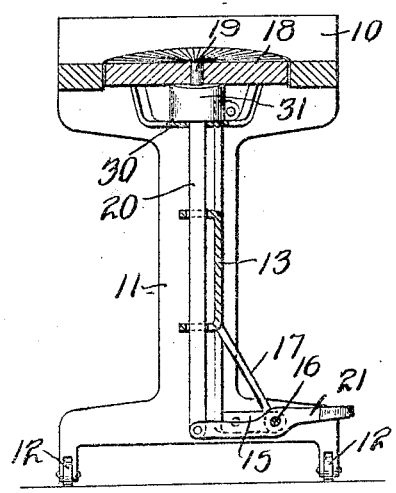
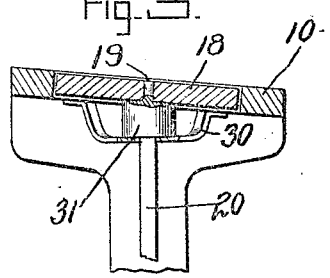
Inventor
George W. Futch
By
Attorney Patented Feb. 17, 1925.

1,527,039

UNITED STATES PATENT OFFICE.

GEORGE W. FUTCH, OF BOWLING GREEN, FLORIDA.

FRUIT-PACKER'S TABLE.

Application filed June 17, 1922. Serial No. 569,147.

*To all whom it may concern:*

Be it known that I, GEORGE W. FUTCH, a citizen of the United States, residing at Bowling Green, in the county of Hardee and State of Florida, have invented certain new and useful Improvements in Fruit-Packers' Tables, of which the following is a specification.

My said invention relates to a fruit packer's table and it is an object of the same to provide a device of this kind which will enable the packer in using an ordinary crate having a compartment at each end to swing the same end for end without needless effort. In the use of such crates it is convenient to have one end of the crate near the bin from which the fruit is taken and after that end is filled the crate should be turned to bring the other end near the bin. Because of the weight of the fruit in the full end of the crate it is a matter of difficulty to perform this labor, and especially so for women and children, particularly as the crate usually stands on a bench or table at some distance from the ground. By the use of my device the reversing operation may be performed very easily and quickly irrespective of the weight of the crate.

Referring to the accompanying drawings which are made a part hereof and on which similar reference characters indicate similar parts, Figure 1 is a perspective of my device, Figure 2 a central transverse section on the dotted line 2—2 in Figure 1, and Figure 3 a detail section similar to a portion of Figure 2 showing a modified form in which the table top is tilted toward the front instead of toward the end.

In the drawings reference character 10 indicates the top of a table here shown as having end supporting members 11 extending down to the ground or the floor and preferably mounted on rollers 12. Said members are held in place by bracing means here shown in the form of a single brace member having a body 13 and lateral extensions 14 inclined so as to be adapted for attachment respectively at the top and bottom ends of the opposed end supporting members. At their lower ends the lower brace members have extensions 15 in which is journaled a shaft 16. This shaft for further security also has bearings in arms 17 inclined downwardly and rearwardly from the body 13.

The top 10 of the table is preferably inclined toward the end or side where the packer stands so that the fruit when placed in position will not roll, and has a central circular orifice in which is located a disk 18 having radial serrations in its top. Said disk is mounted to rotate on a gudgeon 19 on the upper end of shaft 20, which passes downwardly through a bearing in the body 13, and is pivoted at its lower end to the inner end of a pedal 21 mounted on the shaft 16 which may rock with the pedal or, if preferred, the pedal may be loosely journaled on the shaft, and the shaft may be rigidly held in place. Normally the disk 18 is flush with the top of the table or may rest a little below the plane of the upper surface of the table, and the crates 22 are placed on the table, with their longest dimension extending in the direction of the length of the table, as shown in Figure 1.

The upper end of the shaft 20 is supported in a bearing in bracket 30 hung to the under side of the disk and a block 31 rests between said bracket and disk to afford a firm support for said disk, particularly during the turning operation.

The crate when in the position indicated has one end adjacent the bin and the operator fills the compartment at that end after which he places one foot on the tread of the pedal 21 and bears down on the same to raise the disk 16 with the crate thereon. As the crate is elevated the operator places one hand on the light or unloaded portion to steady the crate and turns it, the disk 18 turns on gudgeon 19 of shaft 20 being held to turn with the box by the serrations in the top of the disk.

Other modifications besides those above suggested will occur to those skilled in the art and therefore I do not limit myself to the precise mechanism shown and described but only as indicated in the appended claim.

Having thus fully described my said invention, what I claim as new and desire to secure by Letters Patent, is:

A table comprising a top, end supports, a rotatable supporting element operable through the top, a vertical shaft for raising the supporting element, a lever for operating the vertical shaft, a horizontal shaft adapted to fulcrum the said lever, and a single brace member for bracing the end supports and for forming bearings for both the said shafts, substantially as set forth.

In witness whereof, I have hereunto set my hand and seal at Bowling Green, Florida, this 6th day of June, A. D. nineteen hundred and twenty-two.

GEORGE W. FUTCH. [L. S.]

Witnesses:
J. M. FORD,
W. R. MINOR.